United States Patent [19]

Tsuboi

[11] Patent Number: 4,885,733
[45] Date of Patent: Dec. 5, 1989

[54] METHOD OF, AND SYSTEM FOR, DETECTING AN EXCESSIVE LOADING CONDITION OF MULTIPLE DISKS IN A VIDEO DISK APPARATUS

[75] Inventor: Hiroaki Tsuboi, Saitama, Japan

[73] Assignee: Pioneer Electric Corporation, Tokyo, Japan

[21] Appl. No.: 182,015

[22] Filed: Apr. 15, 1988

[30] Foreign Application Priority Data

Apr. 15, 1987 [JP] Japan .................................. 62-92320

[51] Int. Cl.$^4$ .............................................. G11B 19/04
[52] U.S. Cl. ....................................... 369/45; 250/201; 369/58
[58] Field of Search ..................................... 369/43–46, 369/54, 58; 250/201 DF; 358/342

[56] References Cited

U.S. PATENT DOCUMENTS

| 4,446,546 | 5/1984 | Miller | 369/45 |
| 4,512,003 | 4/1985 | Kimura et al. | 369/45 |
| 4,654,516 | 3/1987 | Ando | 369/44 |
| 4,700,056 | 10/1987 | Silvy et al. | 369/45 |
| 4,701,603 | 10/1987 | Dakin et al. | 369/45 |
| 4,723,234 | 2/1988 | Katsuyama et al. | 369/58 |
| 4,724,492 | 2/1988 | Kosaka et al. | 358/342 |

Primary Examiner—Donald McElheny, Jr.
Attorney, Agent, or Firm—Sughrue, Mion, Zinn, Macpeak & Seas

[57] ABSTRACT

A system for detecting an excessive loading condition of multiple disks in an optical disk reading apparatus. In the system, a parking position of a pickup is established at a predetermined position between respective outer circumferences of a first large-diameter disk and a second small-diameter disk. Upon application of a predetermined input for initiating a reproduction operation, a focusing servo is locked-in or initially focused at the parking position. The pickup is then moved to a lead-in region which is at an inner circumference of the first disk. If the lock-in of the focusing servo is released (i.e., a substantial variation in focusing is sensed) during movement of the pickup, a predetermined operation amounting to an alarm indication is performed to indicate that there is an excessive loading condition of multiple disks in the video disk apparatus.

10 Claims, 4 Drawing Sheets

METHOD OF, AND SYSTEM FOR, DETECTING AN EXCESSIVE LOADING CONDITION OF MULTIPLE DISKS IN A VIDEO DISK APPARATUS

FIELD OF THE INVENTION

The present invention relates to a disk detecting system to be suitably used, for example, in an optical disk player in which a selected one of an optical video disk and a compact disk can be reproduced. More particularly, the invention relates to a method of, and system for, detecting an excessive loading condition of multiple disks in a video disk apparatus.

BACKGROUND OF THE INVENTION

In an optical video disk player of a so-called compatible type, the information stored on a compact disk an be reproduced. FIGS. 2 and 3 are sectional views of a video disk mounting approach for an optical video disk player. A centering hub 2 having two conical portions 3 and 4 is mounted at a central portion of a turntable 1. The conical portion 3 comes into contact with an inner circumference of a video disk 6 when the video disk 6 is mounted, while the conical portion 4 comes into contact with an inner circumference of a compact disk 7 when the compact disk 7 is mounted, thereby performing centering of the disk. During the mounting of a compact disk 7, the centering hub 2 is made to descend or depress into the inside of the turntable 1 as can be seen in FIG. 3. A stopper 5 is arranged so that the distance D from the lower end of the stopper 5 to the turntable 1 is set to be substantially equal to the sum of the thickness of the video disk 6 and that of the compact disk 7.

In the event the video disk 6 is mounted while the compact disk 7 is left on the turntable 1, the video disk 6 comes into contact with the stopper 5 to increase the load of the turntable 1 so that the turntable 1 becomes impossible to rotate. Thus, a mechanical stopper approach is utilized to prevent operation of the video disk player when there is a double mounting of disks.

As described above, the stopper 5 is arranged so as to come into contact with the video disk 6. However, the stopper 5 does not make contact and does not operate as a stopper if the distance D is set to be unsuitably large, while, on the contrary, the stopper 5 acts as an obstruction and it becomes difficult to mount a disk if the distance D is set to be unsuitably small. In the latter situation, there exists a danger that the excessively loaded disks will become damaged due to excessive mechanical contact between the disks and excessive mechanical contact between a disk and the mechanical stopper. Accordingly, in order to utilize the above-described mechanical stopper approach, it is necessary to accurately determine and adjust the distance D during manufacturing, resulting in an increased burden on manufacturing and increased manufacturing costs.

SUMMARY OF THE INVENTION

It is therefore an object of the present invention to make it possible to detect double mounting of disks with little burden on manufacturing, and without the danger of mechanical damage to the disks.

In order to attain the above object, according to the present invention, a pickup is moved in the direction toward the inner circumference after a focusing servo of the pickup is locked-in or initially focused when a reproducing operation is started, and detection of double mounting of disks is performed when the lock-in of the focusing servo is released (i.e., substantial variation in focusing is sensed) during the above indicated movement of the pickup.

In the disk detecting system, a parking position of a pickup is established at a predetermined position between respective outer circumferences of a first large-diameter disk and a second small-diameter disk, and upon application of a predetermined input which signals the start of a reproduction operation, a focusing servo is locked-in or initially focused at the parking position, (i.e., a beam from the laser diode in the pickup device is focused at the parking position) the pickup is moved to a lead-in region which is at an inner circumference of the first disk, and if the lock-in of the focusing servo is released (i.e., a substantial variation in focusing is sensed) during movement of the pickup, a predetermined operation amounting to an alarm indication is performed to indicate that there has been an excessive loading condition of multiple disks in the video disk apparatus.

The parking position of the pickup is established at a position between the respective outer circumferences of the first and second disks. The focusing servo is locked-in or focused at the parking position upon application of an input which signals the initiation of a reproduction operation. Next, the pickup is moved toward the inner circumference to the lead-in region of the first disk. When the lock-in of the focusing servo is released during the movement of the pickup from the parking position to the lead-in region, a predetermined operation is performed to indicate a mistaken double disk mounting.

DESCRIPTION OF THE PREFERRED EMBODIMENT

Figure 1:
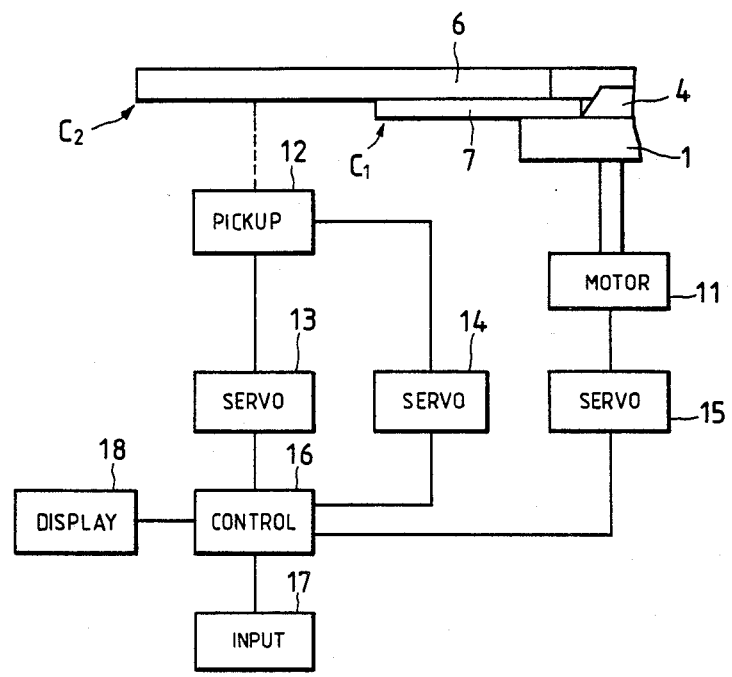
FIG. 1 is a block diagram showing an optical video disk player according to the present invention.
Figure 2:
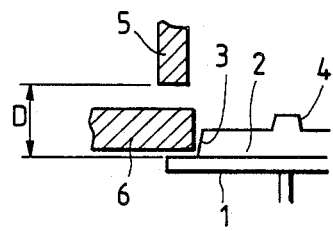
FIGS. 2 and 3 are sectional views each showing a part of a disadvantageous approach of a mounting system for an optical disk.
Figure 3:
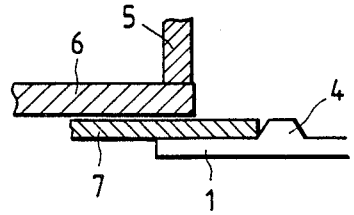

FIG. 1 is a block diagram showing an embodiment of the optical video disk player according to the present invention. If a command to initiate reproduction is fed through an input means 17, control circuit 16 comprising a microcomputer controls a servo circuit 15 to rotate a motor 11. The motor 11 rotates a turntable 1, and hence rotates a disk mounted on the turntable 1.

A pickup device 12 is positioned at a parking position prior to initiation of the reproducing mode of operation. The pickup device 12 is the pickup device which is used for reading the normal information from the disk. The parking position is established at a predetermined position between the respective outer circumferences of a large-diameter video disk 6 ($C_2$) and a small-diameter compact disk 7 ($C_1$). Upon reception of a command initiating the reproducing mode of operation, the control circuit 16 also controls a servo circuit 13 so as to lock-in a focusing servo (i.e., perform an initial focusing operation at the parking position). That is, a beam from the laser diode in the pickup device is focused at the parking position. If the focusing servo cannot be locked-in at the parking position, the control circuit 16 causes a display means 18 to display a predetermined indication to indicate that no disk is mounted on the turntable 1.

Upon completion of lock-in or focusing of the focusing servo, the control circuit 16 controls a servo circuit 14 to move the pickup device 12 to a lead-in regio in the vicinity of an innermost circumference of a video disk 6 at a high speed (with a tracking servo loop opened). When a compact disk 7 is not mounted under the video disk 6, reproducing is started from the lead-in region upon the arrival of the pickup 12 at that region. If a compact disk 7 is mistakenly double mounted under the video disk 6, a reflex or focusing surface of the compact disk 7 represents a focusing surface which is at a substantial different focusing plane that that of the video disk 6, hence there is detected a substantial change in focusing when the pickup device 12 reaches the outer circumference of the compact disk 7, so that the lock-in of the focusing servo is released. As a result of the foregoing, the control circuit 16 performs a predetermined operation mounting to an alarm indication, e.g., causes the display means 18 to reflect a predetermined display which indicates that the video disk 6 and the compact disk 7 are double mounted. As a result of the alarm indication, an operator can notice the excessive loading condition of multiple disks in the video disk apparatus, and can take out the compact disk 7. In addition to the operation of a display, any other type of alarm indication can be carried out, for example, the video disk apparatus can be constructed to positively eject any excessively loaded disk.

The lock-in operation of the focusing servo according to the present invention will now be discussed in greater detail.

Figure 4A:
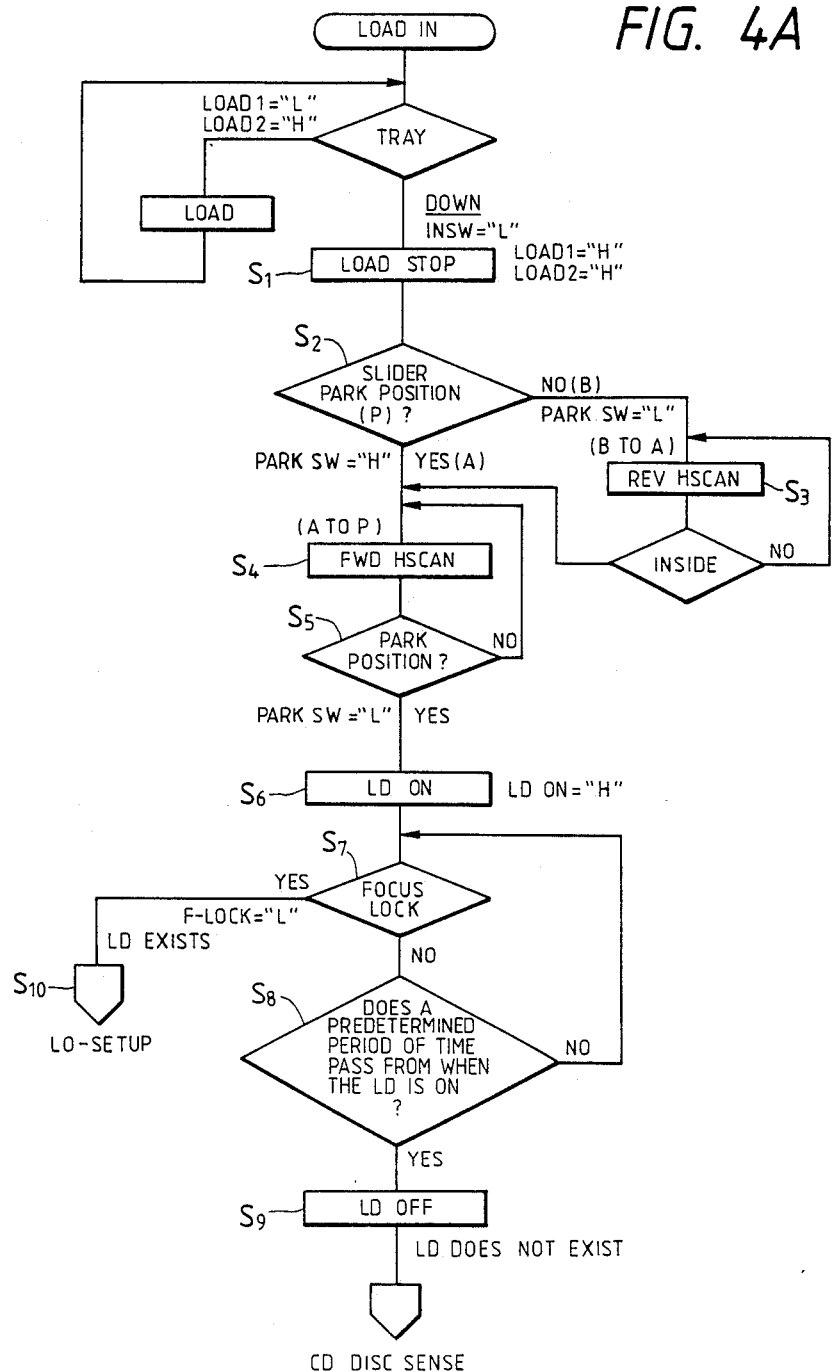
FIGS. 4A and 4B show a flow chart of the disk loading and focus lock operation conducted in the present invention.
Figure 4B:
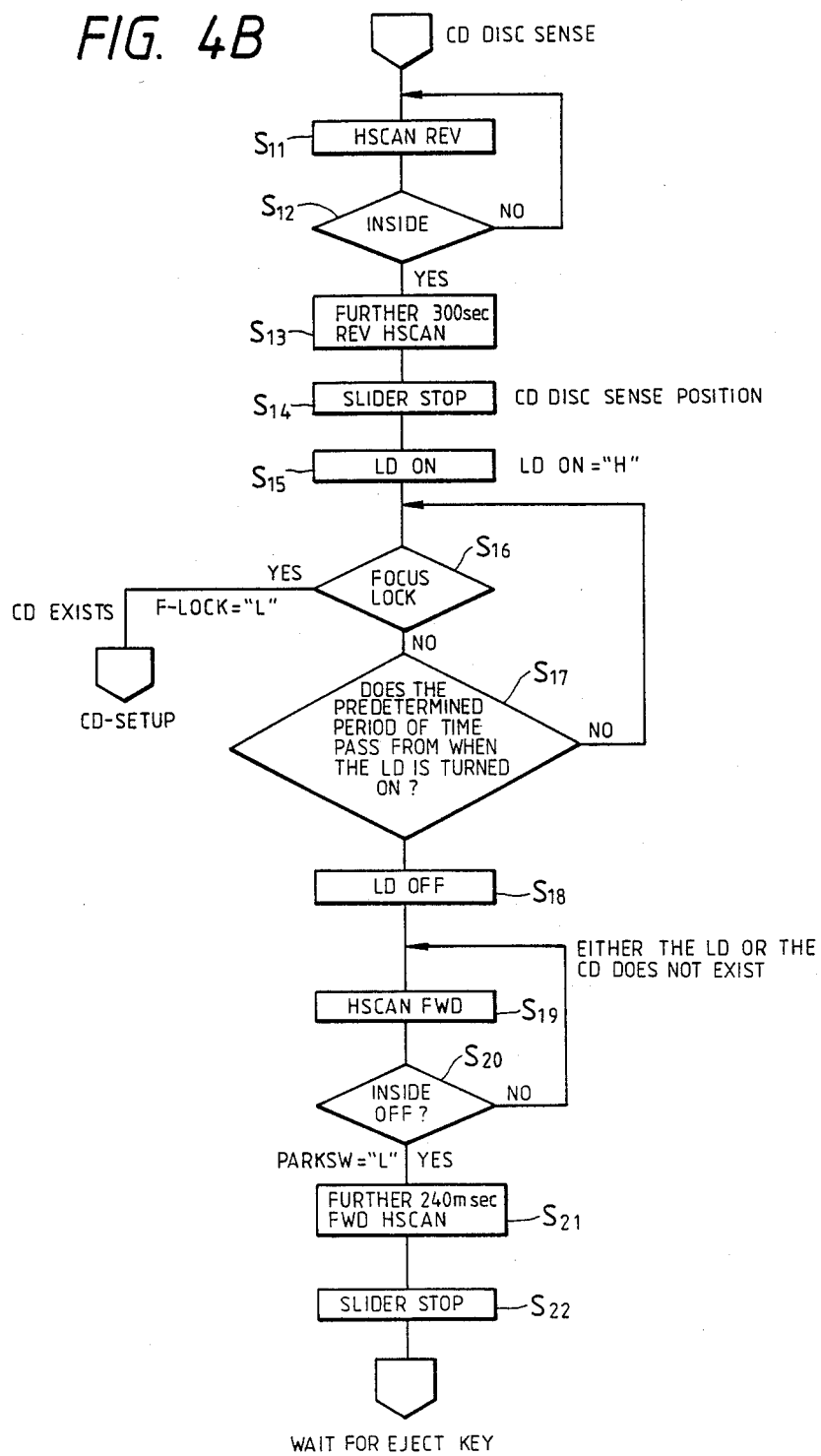

FIGS. 4A and 4B show flow chart of the disk loading and focus lock operation conducted in the present invention.

Figure 5:
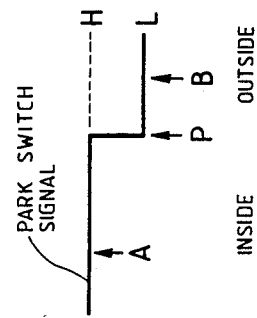
FIG. 5 shows the level of the park switch signal.

Initially, the turnable or tray on which an optical video disk such as a laser disk and/or compact disk are mounted is moved to a stop position (i.e., clamp position) by the use of the loading means such as motor (Step S1). Then, Step S2 judges the position of the pickup device 12 with respect to the disk, i.e., whether the pickup device 12 is at a parked position. Step S2 through S5 are conducted to move the pickup 12 to a parking position of the disk, as follows: A park switching means provided on the slider means for moving the pickup device detects park switch signals from the disk. Step S2 as shown in FIG. 5, when the park switching means detects the park switch signal at a high level, the pickup device is indicated as being in a region A inside of a parking position. When the park switching means detects the park switch signal at a low level, the pickup device is indicated as being in a region B outside of the parking position. Therefore, the pickup device 12 is moved by the slider means in a radius direction of the disk, the levels of the park switching signal is changed at the park position P from the HIGH to LOW (or from the LOW to HIGH), as shown in FIG. 5 to thereby detect the parking position P. Therefore, at the Step S2, if the park switch signal is low level, that is, if the pickup exists in the region B outside of the park position, the pickup device is moved in a direction toward the inside of the disk by REV HIGH scanning (Step S3). On the other hand, if the level of the switch signal is high and the pickup device exists in the region A inside of the park position, the pickup is moved by FWD HIGH scanning (Step S4) in a direction toward the outside of the disk to the parking position. Then, S5 judges whether or not the pickup exists at the park position.

When the pickup device is at the parking position P, laser beam is outputted from the LD (laser diode) in response to the command from the CPU (Step S6).

Step S7 detects whether or not the laser beam can be focused on the disk and the focusing operation can be locked. In the Step S7, if it is detected that the focusing may not be locked, the object lens in the pickup device is moved to focus the beam onto the disk. Then, the step S7 is conducted again in an attempt to establish focus within a predetermined period of time (for example, 1.7 seconds). Then, if it is judged that the focusing operation is not locked within the predetermined period of time (Step 8), the laser diode is turned off to indicate a determination that the optical video disk (LD disk) is not mounted on the tray (Step S9). Then, the steps S11 through S22 are conducted for sensing whether the compact disk is mounted on the tray or not.

To sense whether a compact disk is mounted, a high speed reverse scan operation is conducted (FIG. 4B) until the pickup device is moved to an inside area of the tray. (Steps 11,12). A further high speed reverse scan operation is conducted (Step 13), e.g., 300 m sec, to insure that the pickup device is positioned at an inside area of the tray, i.e., at a position where the focus of the pickup device would confront any compact disk which has been mounted. A slider mechanism is then stopped and locked (Step 14) and the laser device LD is turned on (Step 15). At Step 16, it is determined whether a focus lock operation can be successfully conducted. If yes, a CD disk is determined as having been mounted and an appropriate CD-Setup signal is produced (Step 16a). If no, the object lens in the pickup device is moved, and if a predetermined period of time has not passed (Step 17), Step 16 is repeated in an attempt to establish focus. If the predetermined amount of time (Step 17) passes before focus can be established, the laser device is turned off (Step 18), and high speed forward scan operations are conducted (Steps 19, 20, 21) to move the pickup device to the approximate parking position. A slider mechanism is stopped (Step 22), with the result of the foregoing operations being an indication that a CD disk has not been mounted.

In turning back now to a discussion of the focusing operations with respect to laser disk (FIG. 4A), in the case where the focusing operation is locked within the predetermined time period from the time when the laser diode is turned on (Step S7), the LD disk is set up and detection of the excessive loading of disks according to the present invention is achieved (Step S10), as follows:

After focus lock is achieved at the parking position P, the pickup device is moved in a direction toward the inside of the disk, by the slider means. That is, as shown in FIG. 6, the pickup is moved in a direction to the left.

Figure 6:
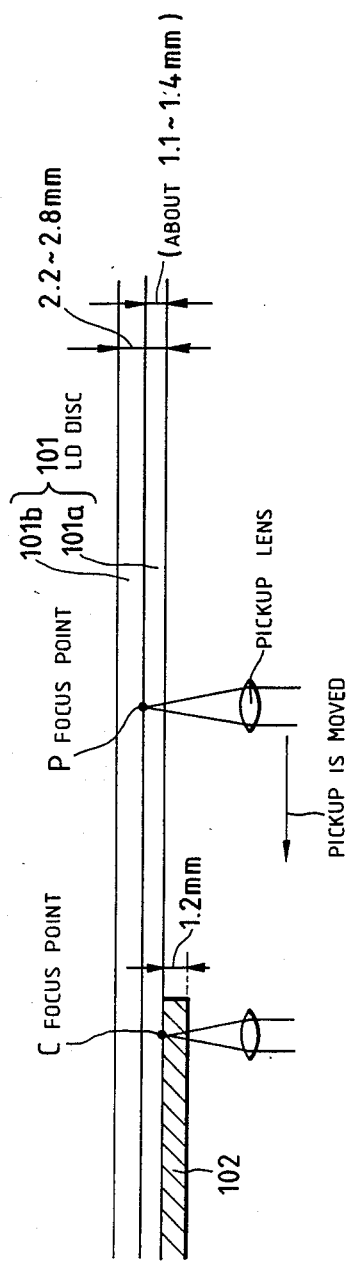
FIG. 6 illustrates the relationship between the pickup lens in the pickup device and disks mounted on a turntable.

As shown in the FIG. 6, assume now that both the LD disk 101 and the CD disk 102 are mounted on the tray. The optical video disk 101 such as laser disk has a thickness of about 2.2 to 2.8 mm, and is formed by bonding two disks 101a and 101b together. On the other hand, the compact disk 102 has a thickness of about 1.2 mm. In order to focus a laser beam from the laser diode onto the LD disk, the pickup lens in the pickup device must be positioned at a position having a predetermined distance from the face of the disk 101a where the disk 101a is bonded to the other disk 101b to form the LD disk 101. Similarly, in order to focus the laser beam onto the CD disk, the pickup lens must be positioned at a position having the same predetermined distance from the face of the compact disk 102 facing the LD disk. Therefore, in this case, a focus servo circuit which was initially locked in for focusing the laser beam at a parking position P on the LD disk (FIG. 6) will cause the pickup device to lose focus when the pickup device is moved to a position to confront the CD disk, e.g., position C on the CD disk, since there is a distance of about 1.1 to 1.4 mm between the focus point on the CD disk and the focus point on the LD disk. Therefore, as a result of the loss of focus, the focus lock is released when the pickup device has reached the outer circumference of the compact disk, as a result of which excessive loading of the disks are detected.

The present invention is not limited to use with a video disk player for selectively reproducing a video disk and a compact disk, but is also applicable to any other type of disk player or reproducing apparatus which utilize a plurality of disks having different diameter sizes.

As described above, in the disk detecting system according to the present invention, a parking position of a pickup is established at a predetermined position between respective outer circumferences of a first large-diameter disk and a second small-diameter disk, and upon application of a predetermined input to initiate a reproduction operation, a focusing servo is locked-in or initially focused at the parking position, the pickup is moved to a lead-in region at an inner circumference of the first disk, and if the lock-in of the focusing servo is released during movement of the pickup, a predetermined operation is performed to indicate that there has been an excessive loading condition of multiple disks in the video disk apparatus. Accordingly, it is possible to prevent damage of disks due to mechanical contact between the excessively loaded disks and mechanical contact between a disk and a mechanical stopper. This advantage is realized by avoiding the above-mentioned mechanical stopper approach, and utilizing a focusing servo approach. This focusing servo approach is particularly advantageous because it can be implement without the addition of special parts.

What is claimed is:

1. A method of detecting an excessive loading condition of multiple disks in a disk playing apparatus having a pickup means, said disks comprising at least a first disk having a first outer circumference and a second disk having a second outer circumference which is larger than said first outer circumference, said method comprising the steps of:

focusing a beam from said pickup means at a predetermined parking position which is located at a predetermined position between said first outer circumference of said first disk and said second outer circumference of said second disk; and monitoring for a substantial change in focusing as said pickup means is moved in a direction toward an inner circumference of said first disk, wherein a substantial change in focusing is an indication that there is an excessive loading condition of multiple disks in said disk apparatus.

2. A method as recited in claim 1, wherein said first disk and said second disk are optical disks.

3. A method as recited in claim 2, wherein said first disk is a compact disk, and wherein said second disk is a video disk.

4. A method as recited in claim 3, wherein said focusing step is accomplished utilizing a focusing servo which is locked-in to a focused state at said predetermined parking position.

5. A method as recited in claim 4, comprising the further step of:

producing an alarm indication when a substantial change in focusing is detected, to indicate that there is an excessive loading condition of multiple disks in said disk playing apparatus.

6. A system for detecting an excessive loading condition of multiple disks in a disk playing apparatus having a moveable pickup means, said disks comprising at least a first disk having a first outer circumference and a second disk having a second outer circumference larger than said first outer circumference, said system comprising:

means for focusing said pickup means at a predetermined parking position which is located at a predetermined position between said first outer circumference of said first disk and said second outer circumference of said second disk; and means for detecting a substantial change in focusing as said pickup means is moved in a direction toward an inner circumference of said first disk, wherein the detection of a substantial change in focusing is an indication that there is an excessive loading condition of multiple disks in said disk playing apparatus.

7. A system as recited in claim 6, wherein said first disk and said second disk are optical disks.

8. A system as recited in claim 7, wherein said first disk is a compact disk, and wherein said second disk is a video disk.

9. A system as recited in claim 8, wherein said means for focusing is a focusing servo which can be locked-in to a focused state at said predetermined parking position.

10. A system as recited in claim 9, further comprising:

means responsive to said detecting means for producing an alarm indication, when a substantial change in focusing is detected, which indicates that there is an excessive loading condition of multiple disks in said disk playing apparatus.

* * * * *